No. 871,491. PATENTED NOV. 19, 1907.
J. S. DUNLAP.
COFFEE POT.
APPLICATION FILED SEPT. 12, 1906.
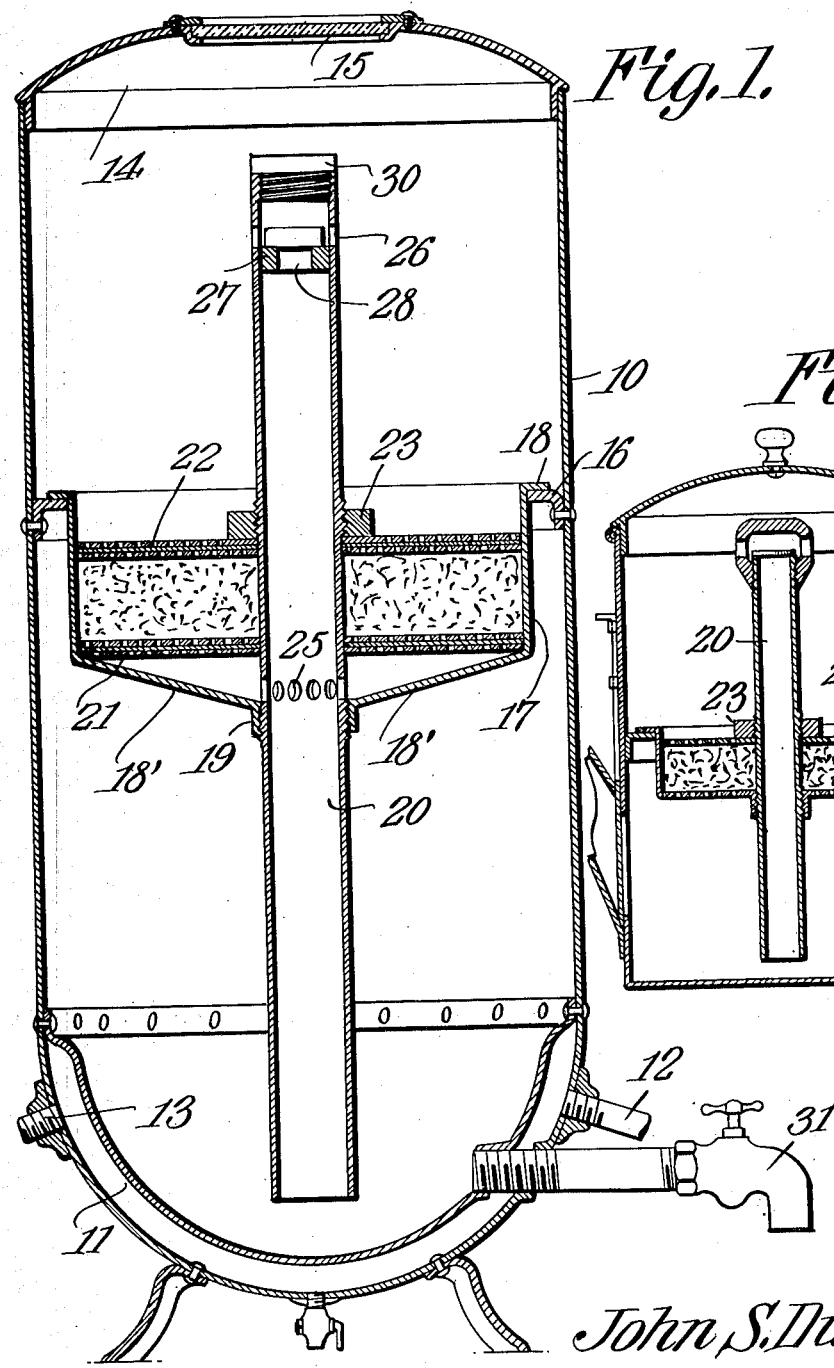
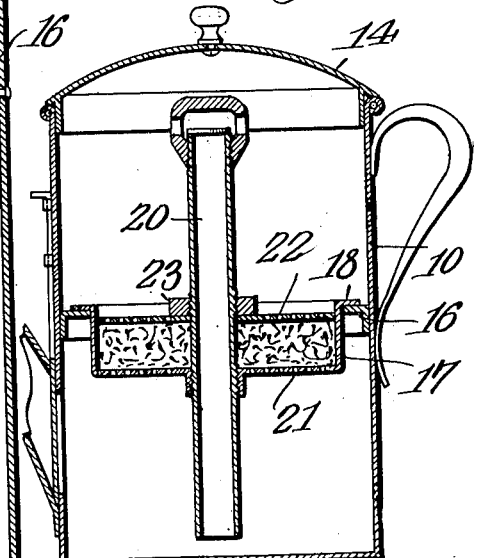
Fig. 1.
Fig. 2.
WITNESSES:
John S. Dunlap,
INVENTOR.
By C. A. Snow & Co.
ATTORNEYS

UNITED STATES PATENT OFFICE.

JOHN SMITH DUNLAP, OF CHICAGO, ILLINOIS.

COFFEE-POT.

No. 871,491.     Specification of Letters Patent.     Patented Nov. 19, 1907.

Application filed September 12, 1906. Serial No. 334,300.

*To all whom it may concern:*

Be it known that I, JOHN SMITH DUNLAP, a citizen of the United States, residing at Chicago, in the county of Cook and State of Illinois, have invented a new and useful Coffee-Pot, of which the following is a specification.

This invention relates to coffee pots or urns, and has for its principal object to provide a structure in which a strong infusion of coffee or other material may be made in a comparatively short time.

A further object of the invention is to provide a device of this kind in which the water is caused to percolate through the coffee in both directions, so that an infusion of full strength is insured.

A still further object of the invention is to provide a device of this character in which the water is driven upward through the coffee by increase in temperature at the lower portion of the urn or pot, and is caused to again descend through the coffee by the lowering of the temperature at the bottom of the urn or pot.

A still further object of the invention is to provide a device of this class which is to some extent self regulating in its nature, that is to say, in which the water will not be driven through the coffee with undue speed in case of sudden rise in temperature of the water.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a coffee urn embodying the invention. Fig. 2 is a detail sectional view illustrating a slight modification of the invention and showing the same as applied to a coffee pot.

Similar numerals of reference are employed to indicate corresponding parts throughout the several figures of the drawings.

The casing 10 of the urn may be formed of any suitable metal, and is of any dimensions. The bottom of the casing is generally semi-spherical in form and has a jacket space 11 into which steam or other heating agent may be introduced through a pipe 12, and water or other cooling agent through a pipe 13. The top or cover 14 of the urn is made removable, and is preferably provided with a transparent panel 15.

At a point slightly above the central portion of the casing is a flange 16, preferably in the form of an angle bar in cross section, the vertical web of the bar being riveted or otherwise secured to the casing. This flange serves as a support for the percolator, which, in the present instance, comprises a cylindrical casing 17 having an outwardly bent annular flange 18 that rests on the flange 16, and the casing 17 is arranged to fit snugly against the inner wall of said flange 16, so that a tight joint will be formed to prevent the passage of water, although not sufficiently tight to interfere with the ready removal of the percolator and circulating devices, so that the urn may be thoroughly cleansed.

The casing 17 is open at the top and is provided with a bottom portion 18 which tapers toward a central annular flange 19 having an internal thread for the reception of a circulating pipe 20, the lower open end of which is adjacent to the bottom of the urn. Arranged in the lower portion of the percolator casing are one or more perforated disks 21 having central openings for the passage of circulating pipe 20. The coffee or other material from which an infusion is to be made is placed on top of the disks 21, and other disks 22 are then placed on top of the material, the upper disks being held down by a binding nut 23 that is screwed on a threaded portion of the tube 20.

The tube 20 is provided at a point between the bottom 18 of the percolator and the lower perforated disks with a plurality of openings 25 to permit the passage of the water, and near the top of the tube are openings 26 through which the water may pass in case of excessive rise in temperature at the lower portion of the urn. Immediately below the openings 26 is a seat 27 for a valve 28, and the valve is weighted to any desired extent, so that it will only open when the pressure in the lower portion of the urn increases beyond a predetermined point. The extreme top of the tube is provided with female threads for the reception of a closing plug 30 which acts also to prevent the valve being blown out of place.

In operation, the coffee or other material being placed in the percolator and a suitable quantity of water having been introduced into the bottom of the urn, the steam or other heating fluid is admitted through the pipe 12 to the jacket 11, and as the temperature of the water is increased, it will be forced to travel up through the tube 20 through the perforations 25, and through the coffee, the pressure of steam outside the tube in the lower portion of the urn compelling the water to take this course. Should there be an abnormal increase in pressure, the safety valve 28 at the top will open, and a portion of the water will flow out through the openings 26. After the desired quantity of water has been forced up through the tube 20, the supply of steam is cut off, and water or other cooling agent is allowed to enter through the pipe 13. This effects gradual condensation of the steam in the lower portion of the urn, and the excess pressure at the top of the urn aided by gravity will cause the water to again percolate through the coffee, this time passing downward through the percolator, the openings 25 and tube 20, to the bottom of the urn, from whence it may be drawn off through the usual faucet 31. In practice, of course, it is necessary to close the pouring spout, and for this purpose a suitable valve or plug may be employed.

I claim:—

1. In a coffee pot or urn, a casing having an inturned flange, a percolator casing having an outwardly extending flange resting on the casing flange, said percolator having a closed bottom and being provided with foraminous disks, a circulating tube extending through the percolator and having openings above said closed bottom, a valve seat arranged at the upper portion of said tube, there being discharge openings above the valve seat, a weighted valve adapted to the seat, and a plug for closing the top of the tube.

2. In a coffee pot or urn, a casing, a percolator detachably secured within the casing and having a closed bottom, said percolator dividing said casing into upper and lower chambers, a tube through which the liquid may pass directly from the lower to the upper chamber, a valve for closing the tube at a point above the percolator, said valve being opened by excess pressure in the lower chamber, there being an opening to permit the passage of the liquid from the tube through the percolator and into the upper chamber when the pressure is normal.

3. In a coffee pot or urn, a percolator having a closed bottom, said percolator dividing said pot or urn into upper and lower chambers, a tube extending from the lower portion of the lower chamber into the upper chamber, a valve arranged to open on excess pressure in the lower chamber and permit the direct passage of the liquid from the lower to the upper chamber without passing through the percolator, there being a passage for directing the liquid through the contents of the percolator as it flows in the direction of said upper chamber under normal pressure.

4. In a coffee pot or urn, a casing, a percolator having a closed bottom, said percolator dividing the casing into upper and lower chambers, there being a liquid passage through which the liquid is directed through the contents of the percolator when traveling under normal pressure from the lower to the upper chamber, and a normally closed valved passage between the upper and the lower chamber, the valve being arranged to open on excess pressure in said lower chamber to permit direct passage of said liquid into the upper chamber without passing through said percolator.

In testimony that I claim the foregoing as my own, I have hereto affixed my signature in the presence of two witnesses.

JOHN SMITH DUNLAP.

Witnesses:
 JOHN B. VAN KEUREN,
 W. P. PENHALLOW.